United States Patent [19]

Baker

[11] Patent Number: 4,624,837
[45] Date of Patent: Nov. 25, 1986

[54] PARTICULATES AND IRON CYANIDE COMPLEX REMOVAL

[75] Inventor: Daniel C. Baker, Houston, Tex.
[73] Assignee: Shell Oil Company, Houston, Tex.
[21] Appl. No.: 814,707
[22] Filed: Dec. 30, 1985
[51] Int. Cl.$^4$ .................. B01D 45/00; B01D 47/00; C01C 3/00; B03C 3/00
[52] U.S. Cl. .................. 423/215.5; 210/702; 210/749; 210/751; 423/236; 423/210
[58] Field of Search .............. 423/215.5, 236, 210 M, 423/210 R; 210/749, 751, 702

[56] References Cited

U.S. PATENT DOCUMENTS

| | | | |
|---|---|---|---|
| 4,497,784 | 2/1985 | Diaz | 423/236 |
| 4,505,881 | 3/1985 | Diaz | 423/236 |
| 4,508,693 | 4/1985 | Diaz | 423/236 |
| 4,572,826 | 2/1986 | Moore | 423/236 |

*Primary Examiner*—John Doll
*Assistant Examiner*—Lori S. Freeman
*Attorney, Agent, or Firm*—Albert J. Adamcik

[57] ABSTRACT

A process for the removal of cyanide complex or complexes from synthesis gas streams also containing residual iron containing particulate matter is disclosed, the process being characterized by scrubbing of the synthesis gas stream with water or an aqueous stream, removal of absorbed HCN, if any, from solution used in scrubbing, and contact of substantially HCN-free scrubbing solution with a polysulfide reactant at temperatures of from 110° C. to 180° C.

8 Claims, No Drawings

PARTICULATES AND IRON CYANIDE COMPLEX REMOVAL

BACKGROUND OF THE INVENTION

The presence of residual particulates and hydrogen cyanide in various gas streams, especially synthesis gas streams, complicates removal of additional impurities, e.g., removal of $H_2S$ and/or $CO_2$, and poses problems insofar as product quality is concerned. Additionally, in some synthesis gas streams, the presence of reduced iron in the flyash particulates results in the formation of minor amounts of iron cyanide complexes in scrubbing solutions employed in scrubbing the synthesis gas. These iron cyanide complexes present disposal problems, since cyanide concentrations of any type in waste disposal streams are severly restricted by environmental authorities.

If the gas stream is scrubbed with sufficient water or aqueous scrubbing solution, e.g., as described by Diaz in U.S. Pat. No. 4,497,784, entitled "Solution Removal of HCN from Gaseous Streams, with Hydrolysis of Thiocyanate Formed" issued Feb. 5, 1985; U.S. Pat. No. 4,505,881, entitled "Ammonium Polysulfide Removal of HCN from Gaseous Streams, with Subsequent Production of $NH_3$, $H_2S$, and $CO_2$", issued Mar. 19, 1985; U.S. Pat. No. 4,508,693, entitled "Solution Removal of HCN from Gaseous Streams, with pH Adjustment of Reacted Solution and Hydrolysis of Thiocyanate Formed", issued Apr. 2, 1985; and U.S. Ser. No. 685,708, filed Dec. 24, 1984 by G. R. Moore, all incorporated herein by reference, the great bulk of the HCN and the remaining particulates will be removed. In the polysulfide treatment, high temperature or acid hydrolysis described therein, the iron cyanide complex or complexes may also be hydrolyzed. If, however, a limited volume of water or high scrubbing temperatures (or both) are employed, the bulk of the HCN will not be removed from the synthesis gas during scrubbing. On the other hand, if sufficiently low scrubbing temperatures are employed, at least a portion, perhaps the great bulk, if sufficient water is used, will be absorbed. Regardless of whether or not the bulk of the HCN is absorbed, the iron cyanide complex or complexes are produced in the scrubbing mixture. The invention addresses this problem.

SUMMARY OF THE INVENTION

Accordingly, the invention relates to a process for scrubbing a synthesis gas stream containing residual amounts of iron containing particulate solids and minor amounts of HCN, comprising contacting the synthesis gas stream with water in a contact or scrubbing zone and removing the particulate solids from the gas stream and producing an aqueous mixture or stream containing the solids and iron cyanide complex or complexes. If the scrubbing is conducted under conditions to absorb HCN, at least a portion of the mixture is then stripped to remove the absorbed HCN. At least a portion of either the aqueous mixture or of the stripped mixture is contacted at a temperature of from about 110° C. to about 180° C. with ammonium polysulfide, sodium polysulfide, or a mixture thereof. The low temperature polysulfide contacting and heat treatment converts the iron cyanide complex or complexes present and produces a stream or mixture having substantially reduced iron cyanide complex or complexes content or concentration and containing easily removable solids and biodegradable components. As used herein, the term "iron cyanide complex" or "iron cyanide complexes", or any obvious variant thereof, refers to either of or both the ferrocyanide ion, $[Fe^{II}(CN)_6]^{-4}$, and the ferricyanide ion, $[Fe^{III}(CN)_6]^{-3}$. The reactions, in the case of ammonium polysulfide, may be shown, as follows:

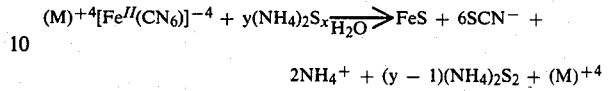

$$2NH_4^+ + (y - 1)(NH_4)_2S_2 + (M)^{+4}$$

wherein (M) is a metal ion or ions, or $NH_4+$, and x is 3, 4 or 5, and y is 4, 2 and 4/3 respectively, or

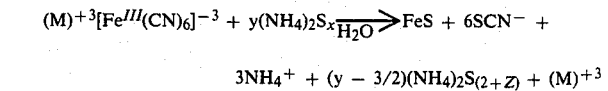

$$3NH_4^+ + (y - 3/2)(NH_4)_2S_{(2+Z)} + (M)^{+3}$$

wherein (M) is a metal ion or ions or $NH_4+$ and x is 3, 4 or 5, while y is 4, 2, and 4/3, respectively, and Z is $$\left(\frac{1}{y - 3/2}\right).$$

(M) will by any available metal ions or ammonium ion in solution providing the appropriate charge balance, suitable metal ions including the ions of Na, K, Li, Ca, Mg, Al, Sn, etc. While it is not necessary that all the HCN absorbed be stripped from the mixture, the polysulfide will react preferentially therewith, thus reducing the efficiency of the process.

The particular type of synthesis gas stream treated according to the invention is not critical. However, the invention is particularly applicable to synthesis gas streams from processes in which HCN is present in a minor amount and in which a flyash which contains reduced iron is present. The efficiency of cyclones and other particulates removal units is such that residual or quite minor quantities, e.g., from about 0.1 to about 10 percent by weight, perhaps about 0.5 percent to about 1.0 percent by weight, of the iron-containing flyash or particulates remains in the synthesis gas. HCN may be present from trace amounts up to one percent by volume, but normally will be present from about 0.002 percent to about 0.1 percent by volume. Obviously, the more effective the particulates removal, the lesser the cyanide complex or complexes formation and removal requirements. Accordingly, the concentrations of the iron cyanide complex or complexes in the mixtures treated are not critical, and may range from detectable or minimal impurity amounts, e.g., less than about 1 ppm, to the solubility limits of the complex or complexes. Generally, the concentrations will range from about 1 ppm to about 200 ppm, normally 10 ppm to about 50 ppm.

The scrubbing solution employed may be water, or water with other materials to assist in the particulates and/or HCN removal. The term "water", as used herein, is understood to include "pure" water, and, more importantly, "impure" water, the latter including impurity materials, such as recycle water from any scrubbing step, the term, however, not being taken to include substantial concentrations of components which react with the HCN or interfere substantially with the polysulfide(s) employed. If it is not desired to absorb or remove substantial amounts of HCN in the scrubbing step of the invention, the conditions are controlled in the scrubbing zone so that significant quantities of HCN are not absorbed. For example, temperatures may be maintained at sufficient levels to inhibit HCN absorption, or limited volumes of water may be employed. Conversely, if it is desired to absorb HCN in the water, conditions are maintained so as to permit absorption or solution of the HCN. For example, the weight ratio of water to gas may be maintained at high levels, e.g., 1 to 10:1, and temperatures of from 40° C. to 90° C. may be employed. If significant quantities of HCN are absorbed, the mixture produced is stripped, e.g., by gas or heat. Suitable stripping gases include inert or substantially inert gases, such as nitrogen, steam or $CO_2$, or recycle synthesis gas. If heat is employed, the temperature may be raised to the desired temperature range of about 110° C. to about 180° C., or a lower temperature, at suitable pressures, as will be understood by those skilled in the art. The solution is stripped to a sufficiently low concentration of HCN that the efficiency of the cyanide complex or complexes removal is not interfered with, as will be understood and suitably accomplished by those skilled in the art.

The scrubbing or particulates removal is preferably carried out continuously, while any stripping and the polysulfide contacting steps may be carried out, in each case, either continuously or batchwise. Preferably, from the scrubbing step a "bleed" of scrubbing solution is continuously removed from the scrubbing zone and sent, if necessary, to the stripping zone. Preferably, a "recycle" of stripped aqueous solution is returned to the scrubbing zone for reuse, and a "bleed" from the stripping zone is sent for removal of the cyanide complex or complexes and disposal. The ratio of recycle, and bleed(s) is dependent on a number of factors, as evident to those skilled in the art, and may be adjusted suitably by those skilled in the art.

The polysulfide contacting may also be carried out batchwise or continuously, but is preferably carried out continuously. In the case where polysulfide must be added, make-up ammonium or sodium polysulfide (or a mixture thereof) is continuously supplied to the contact or conversion zone, and a portion or "bleed" of solution is removed from the conversion zone. Whether batch or continuous, the contacting and conversion is carried out for a time sufficient to convert at least the bulk of the cyanide complex or complexes present, or to reduce the concentration of the cyanide complex or complexes to the level desired or required. This time may vary with the concentrations and actual temperatures employed. Obviously, longer or shorter residence times may be employed than those suggested hereinafter, it not being intended by the specification of appropriate residence times to limit the invention. In the case of a batch operation, a suitable total reaction or residence time, assuming a well stirred system, may range from a few minutes to several hours, preferably from about 10 minutes to about one hour. In the case of a continuous operation, the contacting and conversion are carried out in such a manner that a given portion of solution in passing through the reaction zone has an average residence time as indicated. If the temperatures of the mixture bleed from the stripping zone are suitable (or heating may be employed), the time of the mixture bleed spent in the line or lines from the stripping zone may be included in the total residence time. The total residence time may also include, of course, time spent in the removal line from the contacting or conversion zone. Theoretically, as those skilled in the art will recognize, a "line" may be provided of sufficient length to form the contacting or conversion zone. Turbulent flow reactors may be utilized, or a well stirred vessel is also suitable. The system is preferably closed. Pressures in the conversion zone are not critical, and may range from below atmospheric to 100 atmospheres or more. Preferably, pressures will range from atmospheric to 5 or 10 atmospheres.

Either ammonium polysulfide or sodium polysulfide, or a mixture thereof, may be used, although ammonium polysulfide is preferred. The polysulfide will preferably be supplied as a solution, although the polysulfide may be generated in situ in the hydrolysis or contact zone by reaction of suitable precursors. Polysulfide solution supplied will preferably have a pH of from about 8 to 10, most preferably from 8.5 to 9.5. The pH of the aqueous scrubbing solutions treated may be widely variable, but will preferably range from 7 to 11, most preferably 8.5 to 9.5, and may be adjusted to this range, if desired. Concentrations of the polysulfide are not critical, but the solutions will preferably have polysulfide concentrations of from 0.01 to 1, preferably 0.1 to 0.5 moles per liter. The polysulfide solution may be added to the aqueous solution containing iron cyanide complex or complexes prior to entry into the conversion zone. In general, the polysulfide solution will contain at least a stoichiometric amount of the polysulfide sulfur with respect to the iron cyanide complex or complexes and preferably up to 3 or 4 times the stoichiometric amount. Elemental sulfur may be supplied in the contact or conversion zone to maintain this concentration. As indicated, the contacting or conversion temperatures will range from about 110° C. to about 180° C., preferably from about 120° C. to about 160° C.

Because the mixture, after polysulfide treatment, and now having reduced cyanide complex or complexes concentrations, may contain significant volumes of solids at this point, it is preferably treated for their removal before final disposal. Accordingly, the solution may be, e.g., clarified, filtered or centrifuged. The substantially solids-free solution may be sent to biological waste treatment, since the products of the reactions described are biologically degradable.

The following experiments were conducted.

EXPERIMENT I

Fifty (50) multiliters of an aqueous slurry of flyash particulates (pH 7.5) containing 15 ppm by weight of iron cyanide complex were heated for 15 minutes at 170° C. in a closed vessel with an amount of ammonium polysulfide which was in stoichiometric excess with respect to the iron cyanide complex. Analysis of the product mixture indicated that thiocyanate ion was produced, but detectable amounts of the iron cyanide complex were not observed.

EXPERIMENT II

In a run similar to Experiment I, fifty (50) milliliters of an aqueous slurry of flyash particulates, at a pH of 9.5, containing 150 ppm by weight of potassium ferricyanide, were heated in a closed vessel for 30 minutes at 160° C. with an amount of ammonium polysulfide which was in stoichiometric excess with respect to the ferricyanide complex. Thiocyanate was produced, and the amount of cyanide complex remaining was below the detectable amount.

EXPERIMENT III

About fifty-five (55) gallons of an aqueous slurry produced from scrubbing of coal-derived gases, at a pH of 8.5, and containing iron cyanide complex and polysulfide from the scrubbing operation, were heated for two hours at temperatures of from 110° C. to 120° C. The resultant iron cyanide complex level was 5 ppm by weight.

EXPERIMENT IV

In an experiment similar to Experiment III, but without polysulfide present, the iron cyanide complex level was determined to be 75 ppm by weight.

What is claimed is:

1. A process for scrubbing a synthesis gas stream containing residual amounts of iron containing particulate solids and minor amounts of HCN comprising
   (a) contacting said synthesis gas stream with water in a contact zone and removing the particulate solids from the synthesis gas stream, producing an aqueous mixture containing solids and iron cyanide complex or complexes;
   (b) contacting mixture from step (a) with a member selected from ammonium polysulfide, sodium polysulfide, and mixtures thereof, at a temperature of from 110° C. to 180° C., in a contacting zone and converting iron cyanide complex or complexes in said mixture and producing a mixture having a substantially reduced iron cyanide complex or complexes content.

2. The process of claim 1 wherein the reactant is ammonium polysulfide.

3. The process of claim 2 wherein solids are removed from the mixture having a substantially reduced iron cyanide complex or complexes content, producing a substantially solids-free solution.

4. The process of claim 3 wherein the substantially solids-free solution is subjected to biological waste treatment.

5. A process for scrubbing a synthesis gas stream containing residual amounts of iron containing particulate solids and minor amounts of HCN comprising
   (a) contacting said synthesis gas stream with water in a contact zone and removing the particulate solids from the synthesis gas stream, producing an aqueous mixture containing solids, dissolved HCN, and iron cyanide complex or complexes;
   (b) stripping mixture from step a) to removed absorbed HCN, producing a mixture having substantially reduced HCN content;
   (c) contacting mixture having substantially reduced HCN content from step (b) with a member selected from ammonium polysulfide, sodium polysulfide, and mixtures thereof, at a temperature of from 110° C. to 180° C., in a contacting zone and converting iron cyanide complex or complexes in said mixture and producing a mixture having a substantially reduced iron cyanide complex or complexes content.

6. The process of claim 5 wherein the reactant is ammonium polysulfide.

7. The process of claim 6 wherein solids are removed from the mixture having a substantially reduced iron cyanide complex or complexes content, producing a substantially solids-free solution.

8. The process of claim 7 wherein the substantially solids-free solution is subjected to biological waste treatment.

* * * * *